United States Statutory Invention Registration [19]

[11] Reg. Number: H568

Tanaka et al.

[43] Published: Jan. 3, 1989

[54] OLEFIN POLYMER COMPOSITION AND LAMINATED STRUCTURE INCLUDING SAID COMPOSITION AS ADHESIVE LAYER

[75] Inventors: Haruhiko Tanaka; Katutoshi Kaneko, both of Hiroshima, Japan

[73] Assignee: Shell Oil Company, Houston, Tex.

[21] Appl. No.: 839,253

[22] Filed: Mar. 13, 1986

[30] Foreign Application Priority Data

Mar. 19, 1985 [JP] Japan ..... 60-53430
Mar. 19, 1985 [JP] Japan ..... 60-53431

[51] Int. Cl.[4] ..... C08L 51/04; C08L 53/04; B32B 27/00

[52] U.S. Cl. ..... 525/71; 525/74; 525/78; 525/88; 525/240; 428/461; 428/500; 428/441

[58] Field of Search ..... 525/71, 74

[56] References Cited

U.S. PATENT DOCUMENTS 3,483,276 12/1969 Mahlman ..... 260/897
4,554,304 11/1985 Hansen et al. ..... 525/71

FOREIGN PATENT DOCUMENTS 0131358 1/1985 European Pat. Off. .
1335791 10/1973 United Kingdom .

*Primary Examiner*—John F. Terapane
*Assistant Examiner*—Susan Wolffe

[57] ABSTRACT

An olefin polymer composition comprising (A) 100 parts by weight of a homopolymer of 1-butene composed substantially of 1-butene units or a copolymer of 1-butene and another alpha-olefin containing at least 60 mole % of units derived from 1-butene, (B) 10 to 600 parts by weight of a homopolymer of propylene composed substantially of propylene units, a block copolymer of propylene and another alpha-olefin containing at least 50 mole % of units derived from propylene, or a random copolymer of propylene and another alpha-olefin containing at least 90 mole % of units derived from propylene, and (C) 10 to 600 parts by weight of a crystalline random copolymer of propylene and another alpha-olefin containing 50 to 87 mole % of units derived from propylene, at least one of components (A), (B) and (C) being partly modified with (D) an unsaturated carboxylic acid or its derivative; and a laminated structure comprising a substrate and a layer of a 1-butene polymer laminated thereto through an adhesive layer of the olefin polymer composition.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OLEFIN POLYMER COMPOSITION AND LAMINATED STRUCTURE INCLUDING SAID COMPOSITION AS ADHESIVE LAYER

This invention relates to an olefin polymer composition, particularly an olefin polymer composition useful as an adhesive for bonding poly(1-butene) to various substrates, and to laminated structures obtained by bonding poly(1-butene) to various substrates using the olefin polymer composition as an adhesive.

Poly(1-butene) is flexible and has excellent impact strength, thermal creep resistance characteristics, stress cracking resistance and abrasion resistance. Because of these properties, it has find application in general packaging films, water supply pipes and slurry transporting pipes.

Poly(1-buene) as such does not adhere to polar materials such as metals, concrete, nylon, or a saponification product of ethylene/vinyl acetate copolymer as is the case with other polyolefins such as polyethylene and polypropylene.

Various methods have therefore been proposed heretofore for bonding polyolefins to such polar materials.

Japanese Patent Publication No. 4822/1974 (corresponding to U.S. Pat. No. 3,483,276) describes a metal coating composition comprising an intimate mixture of a propylene polymer (A) and not more than 25% by weight of a maleic anhydride-modified propylene polymer (B) containing about 0.05 to 5% by weight of chemically bound maleic anhydride.

Japanese Patent Publication No. 49989/1980 (corresponding to British Pat. No. 1335791) discloses a two-layer bottle composed of a layer of a crystalline polyolefin modified by grafting an unsaturated polycarboxylic acid or its anhydride and a layer of nylon. This patent document discloses polyethylene, polypropylene, pylene, and copolymers of olefins with each other, such as ethylene/propylene copolymer, ethylene/1-butene copolymer, ethylene/1-hexene copolymer or propylene/1butene copolymer as examples of the crystalline polyolefin. olefin.

Japanese Patent Publication No. 36872/1978 discloses a laminate composed of a resin layer A of a saponification product of a vinyl acetate polymer containing at least 30 mole % of vinyl acetate units, which is obtained by saponifying at least 70 mole % of the acetate ester groups in the copolymer, and a resin layer B of a graft copolymer obtained by grafting not more than 2 mole % of a dibasic unsaturated carboxylic acid to an olefinic polymer.

The above patent documents do not disclose the use of a modified polyolefin obtained by modifying a polyolefin partly or wholly with an unsaturated carboxylic acid or its derivative as an adhesive for bonding poly(1-butene) to a polar material.

Investigations of the present inventors have shown that a modified polyethylene or polypropylene obtained by modification with an unsaturated carboxylic acid or its derivative has excellent adhesion to a polar material, but inferior adhesion to poly(1-butene).

Japanese Laid-Open Patent Publication No. 210,963/1984 (corresponding to Europe Patent Application No. 131358) discloses a composition comprising 100 parts by weight of poly(1-butene), 110 to 1,000 parts by weight of magnesium hydroxide and 10 to 150 parts by weight of a polyolefin modified with an unsaturated carboxylic acid or its derivative. This composition, however, is a poly(1-butene) resin composition having fire retardancy and excellent mechanical properties, and is not an adhesive resin composition.

It is an object of this invention to provide an olefinic polymer composition.

Another object of this invention is to provide an olefin polymer composition having excellent adhesion to both a polar material and poly(1-butene).

Still another object of this invention is to provide a laminated structure resulting from bonding of poly(1-butene) to a polar material by means of the olefin polymer composition.

Other objects and advantages of this invention will become apparent from the following description.

These objects and advantages of the invention are basically achieved by an olefin polymer composition (A) 100 parts by weight of a homopolymer of 1-butene composed substantially of 1-butene units or a copolymer of 1-butene and another alpha-olefin containing at least 60 mole % of units derived from 1-butene, (B) 10 to 600 parts by weight of a homopolymer of propylene composed substantially of propylene units, a block copolymer of propylene and another alpha-olefin containing at least 50 mole % of units derived from propylene, or a random copolymer of propylene and another alpha-olefin containing at least 90 mole % of units derived from propylene, and (C) 10 to 600 parts by weight of a crystalline random copolymer of propylene and another alpha-olefin containing 50 to 87 mole % of units derived from propylene, at least one of components (A), (B) and (C) being partly modified with (D) an unsaturated carboxylic acid or its derivative.

Component (A) of the composition of this invention is a homopolymer of 1-butene composed substantially of 1-butene units, or a copolymer of 1-butene and another alpha-olefin containing at least 60 mole %, preferably at least 70 mole %, of units derived from 1-butene.

The other alpha-olefin units which may be included in the copolymer in a proportion of not more than 40 mole % are derived from at least one alpha-olefin having 2 to 20 carbon atoms such as ethylene, propylene, 1-hexene, 4-methyl-1-pentene, 1-octene, 1-decene and 1-tetradecene. Such copolymers are crystalline.

The polymer as component (A) preferably has an intrinsic viscosity [$\eta$], measured in decalin at 135° C. of 0.7 to 10 dl/g, more preferably 1 to 5 dl/g. If the intrinsic viscosity of component (A) is outside the above range, the moldability of the resulting composition of this invention tends to be reduced. If its intrinsic viscosity is less than 0.7 dl/g, the resulting composition tends to have a reduced adhesion strength.

Component (B) is a homopolymer of propylene composed substantially of propylene units, a block copolymer of propylene and another alpha-olefin containing at least 50 mole % of units derived from propylene, or a random copolymer of propylene and another alpha-olefin containing at least 90 mole % of units derived from propylene.

The other alpha-olefin which gives other alphaolefin units in the block copolymer and the random copolymer may be the same as those which constitute component (A), specifically, an alpha-olefin having 2 to 20 carbon atoms such as ethylene, 1-butene, 1-hexene, 4-methyl-1-pentene, 1-octene, 1-decene and 1-tetradecene.

The polymer component (B) preferably has a melt flow rate (MFR; measured in accordance with ASTM D 1238, L) of 0.1 to 200 g/10 min., more preferably 0.3 to 100 g/10 min.

The polymer component (B) may be produced by methods known per se. It should be understood that the block copolymer mentioned above includes as polymer produced by a method which comprises polymerizing either propylene or another alpha-olefin in the presence of a stereoregular catalyst and then polymerizing the other monomer in the presence of the resulting polymer in the same, or a different, polymerization vessel. Such a polymer differs in chemical structure from the so-called block polymer, and polymeric chains of different compositions are not chemically bonded, but are uniformly mixed therein. It has been sold in the polypropylene resin industry as "block polypropylene", and is characterized by its excellent impact strength. The method of producing this polymer is described, for example, in British Pat. No. 1566391 or European patent publication No. 37291.

Of these block copolymers, propylene/ethylene block copolymer is preferred. Its ethylene content is preferably 3 to 45 mole %, particularly 6 to 25 mole %. Usually, propylene/ethylene block copolymers comprise highly crystalline polypropylene and rubber ethylene/propylene random copolymer and optionally polyethylene. A preferred propylene/ethylene block copolymer comprises 60 to 95% by weight of highly crystalline polypropylene, 5 to 30% by weight of rubbery ethylene/propylene random copolymer, and 0 to 20% by weight of polyethylene.

As component (B), the block copolymer and the random copolymer are preferred to the propylene homopolymer because the former give better olefin polymer compositions which have higher strength of adhesion to polar materials and to a poly(1-butene) layer than the propylene homopolymer. Particularly, where optical properties such as transparency are required as in the field of packaging films, the random copolymer is suitable. The block copolymer is suitable for use in applications which require adhesion strength and impact strength in lamination to metals, for example in the coating of the inner or outer surface of a steel pipe.

Component (C) is a crystalline random copolymer of propylene and another alpha-olefin containing 50 to 87 mole % of units derived from propylene.

The other alpha-olefin giving other alpha-olefin units which may be contained in a proportion of 13 to 50 mole % in the copolymer may be the same as those given above with regard to component (B). Alpha-olefins having 4 to 10 carbon atoms are preferred, and 1-butene is especially preferred.

The copolymer as component (C) contains 60 to 80 mole % of units derived from propylene and 40 to 20 mole % of units derived from the other alpha-olefin.

The copolymer as component (C) preferably has a heat of fusion, determined by thermal analysis by a differential scanning calorimeter (DSC), of 10 to 80 joules/g, more preferably 20 to 70 joules/g. The copolymer preferably has a melt flow rate (MFR; determined in accordance with ASTM D 1238, L) of 0.5 to 200 g/10 min., more preferably 2 to 50 g/10 min. Furthermore, the copolymer (C) preferably has a melting point of 90° to 30° C., more preferably 105° to 125° C.

Preferably, the component (C) has a microisotacticity (MIT for short), in terms of three propylene chains, of at least 0.7, particularly at least 0.8, and a boiling n-heptane insoluble content of not more than 5% by weight, particularly not more than 3% by weight.

The heat of crystal fusion of component (C) in this invention is calculated by using as a base line a straight line which is obtained by directly extrapolating the specific heat curve between 160° and 240° C. of the copolymer in a completely molten state, as determined by a differential scanning calorimeter, to a lower temperature side.

The heat of fusion and melting point are measured under the following operations. A sample is left to stand at 200° C. for 5 minutes, cooled to −40° C. at a rate of 10° C./min., and left to stand at −40° C. for 5 minutes. Thereafter, it is heated up to 240° C. at rate of 20° C./min.

The microisotacticity is determined by calculating the fraction of three isotactically aligned propylenes in a portion composed of three propylene chains in a $^{13}C$ NMR spectrum.

The boiling n-heptane-insoluble content is determined as follows: A sample, about 1 mm×1 mm×1 mm, and glass beads are put in a cylindrical glass filter (G3), and the sample is extracted for 14 hours by a Soxhlet extractor. In this case, the frequency of refluxings is adjusted to 1 per 5 minutes. The weight percent of the insoluble portion is determined by weighing the molten portion or insoluble portion.

A method for producing this propylene/alpha-olefin crystalline random copolymer (C) having a propylene content of 50 to 87 mole % is described, for example, in U.S. Pat. No. 4,168,361.

The olefin polymer composition of this invention comprises 100 parts by weight of component (A), 10 to 600 parts by weight, preferably 30 to 300 parts by weight, more preferably 50 to 300 parts by weight, of component (B), and 10 to 600 parts by weight, preferably 30 to 300 parts by weight, more preferably 30 to 250 parts by weight, of component (C), and at least one of components (A), (B) and (C) should be at least partly modified with (d) an unsaturated carboxylic acid or its derivative.

Examples of the unsaturated carboxylic acid or its derivative (D) include unsaturated carboxylic acids such as acrylic acid, maleic acid, fumaric acid, tetrahydrophthalic acid, itaconic acid, citraconic acid, crotonic acid, isocrotonic acid, and Nadic acid ®, (endocis-bicyclo[2,2,1]hept-5-ene-2,3-dicarboxylic acid), and derivatives thereof such as halides, amides, imides, anhydrides and esters thereof, specifically maleyl chloride, maleimide, maleic anhydride, citraconic anhydride, monomethyl maleate, dimethyl maleate, and glycidyl maleate. Of these, unsaturated dicarboxylic acids having 4 to 8 carbon atoms and their anhydrides are preferred. Maleic acid, Nadic acid ® and their anhydrides are especially preferred.

Preferably, the olefin polymer composition of this invention comprises 100 parts by weight of component (A), 33 to 300 parts by weight of component (B) and 33 to 300 parts of component (C), in which at least one of components (A), (B) and (C) is modified at least partly with component (D). The content of component (D) is preferably 0.001 to 5% by weight, more preferably 0.01 to 4% by weight, based on the total weight of components (A), (B) and (C).

The olefin polymer composition of this invention is obtained, for example, by mixing a mixture of components (A), (B) and (C) with the unsaturated carboxylic acid or its derivative (D) to modify the mixture with component (D); or by first modifying at least one of components (A), (B) and (C) partly or wholly with component (D) and then mixing and kneading at least one modified component with the other components.

Preferably, at least a part of component (B) is modified with the unsaturated carboxylic acid or its derivative particularly in an amount of 0.05 to 8% by weight.

In the present invention, the term "modify" denotes "to combine chemically the unsaturated monomer (D) with at least one of components (A), (B) and (C)." The technique of modification may be any one of those well known to those skilled in the art. As a preferred embodiment, a graft reacting method may be cited. This can be carried out, for example, by polymerizing the unsaturated monomer (D) in the presence of at least one of components (A), (B) and (C) as a trunk polymer to produce a modified polymer in which the unsaturated monomer units are chemically bound to the trunk polymer. Depending upon the type of the unsaturated monomer or the polymerization conditions, the unsaturated monomer units may be bonded to the trunk polymer in the polymerized or oligomerized state, or only one monomer unit may be bonded to the trunk polymer.

More specific and preferred graft modifying methods include a method comprising melt-kneading the trunk polymer component with the unsaturated monomer, and a method which comprises dissolving the trunk polymer component and the unsaturated monomer in a solvent such as benzene, xylene, hexane or heptane, and grafting the unsaturated monomer to the trunk polymer under heating. By whichever method is employed, the reaction is preferably carried out in the presence of a radical initiator in order to graft the unsaturated monomer efficiently. The grafting reaction is usually carried out at a temperature of 60° to 350° C. The proportion of the radical initiator used is usually 0.001 to 1 part by weight, per 100 parts by weight of the polymer.

Examples of the radical initiator used at this time include organic peroxides such as benzoyl peroxide, dichlorobenzoyl peroxide, dicumyl peroxide, di-tert-butyl peroxide, 2,5-dimethyl-2,5-di(peroxide benzoate)-hexyne-3,1,4-bis(tert-butylperoxyisopropyl)benzene and lauroyl peroxide; organic peresters such as tert-butyl peracetate, 2,5-dimethyl-2,5-di(tert-butylperoxy)-hexyne-3,2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate; and azo compounds such as azobis-isobutyronitrile and dimethyl azoisobutyrate. Preferred among these are dialkyl peroxides such as dicumyl peroxide, di-tert-butyl peroxide, 2,5-dimethyl-2,5-di(tert-butylperoxy)hexyne-3,2,5-dimethyl-2,5-di(tert-butylperoxy)hexane and 1,4-bis(tert-butylperoxyisopropyl)-benzene.

The olefin polymer composition of this invention shows excellent adhesion both to the 1-butene polymer and to the polar material.

Investigations of the present inventors have shown that when the composition of this invention lacks component (C) but contains component (B) in a specific proportion with respect to component (A), it likewise serves to achieve excellent adhesion between the 1-butene polymer and the polar material.

Thus, according to this invention, there is provided a second olefin polymer composition comprising (A) 100 parts by weight of a homopolymer of 1-butene composed substantially of 1-butene units or a copolymer of 1-butene and another alpha-olefin containing at least 60 mole % of units derived from 1-butene, and (B) 7 to 120 parts by weight, preferably 11 to 67 parts by weight, of a homopolymer of propylene composed substantially of propylene units, a block copolymer of propylene and another alpha-olefin containing at least 50 mole % of units derived from propylene, or a random copolymer of propylene and another alpha-olefin containing at least 90 mole % of units derived from propylene, at least one of components (A) and (B) being at least partly modified with (D) an unsaturated carboxylic acid or its derivative.

Excepting the proportions of components (A) and (B), the detailed embodiments and preferred embodiments regarding the components (A), (B) and (D) and the modifying methods described hereinabove in connection with the first composition of this invention can be directly applied to the second composition.

Both the first and second olefin polymer composition of this invention may further include another polymer component, such as an alpha-olefin random copolymer having a low crystallinity or being amorphous such as ethylene/propylene random copolymer and ethylene/1-butene random copolymer, an elastomer such as an ethylene/propylene/diene copolymer or polybutadiene, or a crystalline polyolefin such as polyethylene, poly(4-methyl-1-pentene) or ethylene/vinyl copolymer, which are different from components (A), (B) and (C), in such a manner as not to constitute an obstacle to the achievement of the object of this invention. The other polymer component may be incorporated in an amount of not more than 40 parts by weight per 100 parts by weight of the olefin polymer composition.

The olefin polymer composition of this invention may further include known additives conventionally used for polyolefins, such as a heat stabilizer, a weatherability stabilizer, an antistatic agent, a lubricant, a slip agent, a nucleating agent, a pigment or dye, a natural oil or a synthetic oil in such a manner as not to constitute an obstacle to the achievement of the object of this invention.

According to this invention, there is also provided a laminate obtained by laminating a layer of a 1-butene polymer to a substrate via an adhesive layer composed of the olefin polymer composition of this invention by utilizing the excellent adhesion of the olefin polymer composition.

The 1-butene polymer is a homopolymer composed substantially of 1-butene units, or a copolymer of 1-butene and another alpha-olefin containing at least 60 mole % of units derived from 1-butene. The other alpha-olefin may be at least one alpha-olefin having 2 to 20 carbon atoms, such as ethylene, 1-butene, 1-hexene, 4-methyl-1-pentene, 1-octene, 1-decene or 1-tetradecene.

The substrate to which the 1-butene polymer is laminated via the adhesive layer is preferably composed of a polar material. Examples of the polar material include metals such as aluminum, iron, brass, zinc and alloys, inorganic materials and ceramics such as glass and cement; and various polar organic polymers, for example polyamides such as nylon 6, nylon 6-6, nylon 6-10, nylon 11 and nylon 12, polyesters such as polyethylene terephthalate and polybutylene terephthalate, polyvinyl compounds such as polyvinyl chloride, polyvinylidene chloride, polymethyl methacrylate and polymethyl acrylate, polycarbonate, polyphenylene oxide, a saponification product of ethylene/vinyl acetate copolymer and epoxy resins.

The best method of producing the laminate using the olefin polymer composition of this invention should be selected depending upon the shapes of the 1-butene polymer to be laminated and the substrate. For example, there may be employed a method which comprises producing films or sheets of the 1-butene polymer and the substrate, and heat bonding the two with the olefin polymer composition of the invention interposed as an interlayer, or a method which comprises extrusion-laminating the 1-butene polymer and the substrate together with the olefin polymer composition. If the substrate is a thermoplastic resin, a method can be employed which comprises melting the 1-butene polymer, the olefin polymer composition and the substrate in separate extruders, and co-extruding the molten materials from a single die. In any of such methods, it is necessary to heat the olefin polymer composition to a temperature above its melting point.

It is not always necessary to laminate the olefin polymer composition of this invention to poly(1-butene). Alternatively, the olefin polymer composition may be used as a powder and may be used by powder coating, for example by fluidized bed coating which comprises immersing a heated polar material in a fluidized layer of the powdery olefin polymer composition of this invention to coat the composition on the polar material, or a flame coating method which comprises flame-spraying the composition on the polar material by means of a gas burner. Examples of the structure of laminates obtained by using the olefin polymer composition of this invention including the laminated structure of this invention include composition/polar material, poly(1-butene)/composition/polar material, composition/polar material/composition, and poly(1-butene)/composition/polar material/composition/poly(1-butene).

Since the olefin polymer composition of this invention has excellent adhesion both to poly(1-butene) and to a polar material, it may be utilized in slurry transportation pipes, city water conduit pipes, hot water supply pipes, chemical transportation pipes, etc. by coating the inner surface and/or outer surface of metallic pipes with poly(1-butene) using the olefin polymer composition as an adhesive layer. Such coated pipes take advantage of the excellent abrasion resistance, stress cracking resistance, heat resistant creep properties and chemical resistance of poly(1-butene). Also, by laminating poly(1-butene) to an adherend having gas-barrier property such as a polyamide, a saponification product of ethylene/vinyl acetate copolymer or an aluminum foil through the olfein polymer composition of this invention, there can be obtained food packaging films, hollow molded containers for holding foods and chemicals, and pipes for transporting chemicals and slurries which take advantage of the excellent heat resistant creep properties, impact strength, chemical resistance and hygienic property of poly(1-butene).

Since the olefin polymer composition of this invention contains a 1butene polymer having excellent durability, it may be coated on metals, etc. as a powder coating composition and can be conveniently used in the aforesaid applications including slurry transporting pipes.

The following examples illustrate the present invention more specifically. It should be understood however that the invention is in no way limited to these examples alone. All parts and percentages in the following examples are by weight unless otherwise specified.

EXAMPLE 1

One hundred parts of a mixture of 1-butene/ethylene random copolymer (BEC for short; having an ethylene content of 6 mole %, an intrinsic viscosity of 3.1 dl/g, and an MFR, determined by ASTM D1238, E, of 0.2 g/10 min.) and polypropylene (PP for short; having an MFR of 0.5 g/10 min.) 90% of BEC+10% of PP]; 0.2 part of maleic anhydride (MAH for short); and 0.05 part of 2,5-dimethyl-2,5-di(tert-butylperoxy)hexyne-3 (Perhexyne 2.5B, a tradename for a product of Nippon Oils and Fats Co., Ltd.) were mixed by a Henschel mixer, and then melt-kneaded by a single screw extruder (having a full-flighted screw with a diameter of 65 mm; kept at a temperature of 190° C.) to graft MAH and form an olefin polymer composition (I). The amount of MAH grafted in the composition was measured by infrared absorption spectroscopy and found to be 0.15%.

A laminate of poly(1-butene) and a metal, a polyamide or a saponification product of ethylene/vinyl acetate copolymer was produced by using the resulting composition I, and the adhesion strength was measured by the following methods.

(I) Method of evaluating the adhesion strength with respect to metal

The polymer composition (I) was compression-molded under heat to form a sheet having a size of 200×200×0.3 (thickness) mm. A separately prepared sheet, 200×200×2 (thickness) mm, of poly(1-butene) (PB-I for short; having an MFR of 0.4 g/10 min., an intrinsic viscosity of 2.6 dl/g and a density of 0.92 g/cm$^3$) was laminated to a degreased steel sheet having a size of 50×150×2 (thickness) mm with the composition I sheet interposed between them. The assembly was heated for 5 minutes under no pressure by a compression molding machine kept at 200° C. and then consolidated for 1 minute under a pressure of 20 kg/cm$^2$-G to form a laminated sheet. A test sample having a width of 10 mm was cut off from the laminated sheet. One end of the sample was delaminated, and peeled at a peeling speed of 50 mm/min. in accordance with the 90° peel method using an Instron tensile tester (made by Instron Company, U. S. A.). The adhesion strength (peel strength, $F_{Fe}$(kg/cm), of the sample was thus measured.

(II) Method of evaluating the adhesion strength with respect to a polyamide and a saponification product of ethylene/vinyl acetate copolymer A three-layer water-cooled inflation film was prepared under the following conditions from the polymer composition I, PB-1, and nylon 6 (Amilan CM 1021 XP, a tradename for a product of Toray Inc.) or a saponification product of ethylene/vinyl acetate copolymer (EVOH for short; Eval EP-F, a tradename for a product of Kuraray Co. having an MFR, determined by ASTM D 1238, E, of 1.3 g, a density of 1.19 g/cm$^3$, an ethylene content of 32 mole % and a degree of saponification of 100%).

Film layer structure

Outside layer: Nylon 6 or EVOH (20 microns thick)
Interlayer: polymer composition I (10 microns thick)
Inside layer: PB-1 (20 microns thick)

Molding machine (1) 40 mmϕ extruder (for the outside layer) Temperature kept at 250° C. for nylon and 210° C. for EVOH
(2) 30 mmϕ extruder (for the interlayer) Temperature kept at 210° C.
(3) 40 mmϕ extruder (for the inside layer) Temperature kept at 210° C.

Molding speed: 20 m/min.

Test samples, 15 mm wide, were cut off respectively from the resulting two three-layer film. One end of each of the samples was delaminated and peeled at a peeling speed of 300 mm/min. by the T-peel method using an Instron tensile tester. Thus, the adhesion strength (peel strength) between the nylon layer and the composition I layer, $F_{NY}$(g/15 mm), and the adhesion strength (peel strength) between the EVOH layer and the composition I layer, $F_{EVOH}$ (g/15 mm), were measured.

The results are shown in Table 1. In any of these tests, delamination occurred between the polar material and the composition I layer, and no delamination occurred between the composition I layer and the PB-I layer.

EXAMPLE 2

Example 1 was repeated except that an olefin composition (II) obtained by mixing PB-I, propylene/ethylene block copolymer (PEB for short; having an ethylene content of 20 mole % and an MFR of 0.5 g/10 min.) and maleic anhydride-grafted modified propylene polymer (MAH-PP for short; containing 3% of MAH grafted and having an intrinsic viscosity, measured at 135° C. in decalin, of 0.4 dl/g) in the proportions indicated in Table 1 by a tumbler blender and then kneading the mixture in an extruder (having a full-flighted screw with a diameter of 40 mm; temperature kept at 200° C.) was used instead of the composition (I). The results are shown in Table 1.

EXAMPLE 3

Example 2 was repeated except that an olefin polymer composition (III) obtained in the same way as in Example 2 except using BEC described in Example 1 instead of PB-I used in Example 2 was used in place of the composition (II). The results are shown in Table 1.

EXAMPLE 4

Example 1 was repeated except that an olefin polymer composition V obtained in the same way as in Example 1 except using poly(1-butene) (PB-II for short; having an MFR of 0.03 and a density of 0.92 g/cm$^3$) instead of the resin mixture of BEC and PP in Example 1 was used instead of the polymer composition (I). The results are shown in Table 1.

EXAMPLE 5

Example 1 was repeated except that an olefin polymer composition (VI) obtained in the same way as in Example 1 except omitting the use of PP was used instead of the polymer composition I. The results are shown in Table 1.

EXAMPLE 6

Example 2 was repeated except that an olefin polymer composition (VII) obtained in the same way as in Example 2 except using only PB-I and MAH-PP described in Example 2 was used instead of the polymer composition (II). The results are shown in Table 1.

EXAMPLE 7

Example 2 was repeated except that an olefin polymer composition (VIII) obtained in the same way as in Example 2 excepting using PB-I, PEB and MAH-PP in the proportions indicated in Table 1 was used instead of the polymer composition (II). The results are shown in Table 1.

Delamination occurred between the composition (VIII) layer and the PB-I layer in all of the three samples.

EXAMPLE 8

Example 2 was repeated except that an olefin polymer composition (IX) obtained in the same way as in Example 2 excepting further adding BEC used in Example 1 in the proportion indicated in Table 1 was used instead of the composition (II). The results are shown in Table 1.

Delamination occurred between the composition (IX) layer and the PB-I layer in all of the three samples.

TABLE 1

| | Olefin polymer composition | | | | Adhesion strength | | |
|---|---|---|---|---|---|---|---|
| Example | PB (%) | BEC (%) | PP or PEB (%) | MAH-PP (%) | $F_{Fe}$ (kg/cm width) | $F_{NY}$ (g/15 mm width) | $F_{EVOH}$ (g/15 mm width) |
| 1 | — | 90 | 10 | — | 9.6 | 170 | 150 |
| 2 | 60 | — | 35 | 5 | 9.4 | 170 | 150 |
| 3 | — | 60 | 35 | 5 | 9.5 | 190 | 140 |
| 4 | 100 | — | — | — | 6.2 | 60 | 70 |
| 5 | — | 100 | — | — | 6.5 | 40 | 90 |
| 6 | 95 | — | — | 5 | 1.3 | 20 | 10 |
| 7 | 35 | — | 60 | 5 | 5.7 | 80 | 70 |
| 8 | 20 | 15 | 60 | 5 | 4.6 | 70 | 50 |

EXAMPLES 9-11

Poly(1-butene) (PB-I), propylene/ethylene block copolymer (PEB), proylene/1-butene random copolymer (PBR for short; having a propylene content of 71.0 mole %, a heat of fusion of 50 joules/g, a melting point of 110° C., an MFR of 7.0 g/10 min., a boiling n-heptane-insoluble content of 0.5%, a boiling methyl acetate-soluble content of 0.5% and an MIT of 0.94) and MAH-PP were mixed in the proportions indicated in Table 2 by a tumbler blender, and then melt-kneaded by an extruder (having a full-flighted screw with a diameter of 40 mm; temperature kept at 200° C.) to prepare olefin polymer compositions (X) to (XII).

Laminated structures were produced by using the compositions (X) to (XII), poly(1-butene) and a metal, a polyamide or a saponification product of ethylene/vinyl acetate copolymer, and in the same way as in Example 1, the adhesion strength (peel strength) between the nylon layer and the layer of each of the compositions (X) to (XII), $F_{NY}$(g/15 mm), and the adhesion strength (peel strength) between the EVOH layer and the layer of each of the polymer compositions (X) to (XII), FEVOH (g/15 mm), in these laminated structures were measured.

The results are shown in Table 2. In all samples, delamination occurred between the polar material and the compositions (X) to (XII), and no delamination occurred between the compositions (X) t (XII) and the PB-1 layer.

EXAMPLES 12–14

Example 9 was repeated except that olefin polymer compositions (XIII) to (XV) obtained in the same way as in Example 9 except further adding BEC used in Example 1 in the proportions indicated in Table 2 were used respectively instead of the composition (X). The results are shown in Table 2.

EXAMPLE 15

Example 9 was repeated except that an olefin polymer composition (XVI) obtained in the same way as in Example 9 except further adding ethylene/propylene random copolymer (EPC for short; having an ethylene content of 80 mole %, an MFR of 0.4 g/10 min., a density of 0.88 g/cm$^3$ and a crystallinity by X rays of 6%) in the proportion indicated in Table 2 was used instead of the composition (X). The results are shown in Table 2.

EXAMPLE 16

Example 15 was repeated except that propylene-/ethylene random copolymer (PEC for short; having a propylene content of 60 mole %, a crystallinity of 0%, a boiling n-heptane-insoluble content of 0.1%, a boiling methyl acetate-soluble content of 0.8%, an MIT of 0.96, and an intrinsic viscosity of 4.5 dl/g) was used instead of EPC. The results are shown in Table 2.

EXAMPLE 17

Example 9 was repeated except that an olefin polymer composition obtained in the same way as in Example 1 excepting kneading the same components as used in Example 9 in the proportions indicated in Table 2 was used instead of the polymer composition (X). The results are shown in Table 2.

Delamination occurred between the composition (XVII) layer and the PB-I layer.

TABLE 2

| | Olefin polymer composition | | | | | | Adhesion strength | | |
|---|---|---|---|---|---|---|---|---|---|
| Example | PB (%) | BEC (%) | PEB (%) | PBR (%) | EPC or PEC (%) | MAH-PP (%) | $F_{Fe}$ (kg/cm width) | $F_{NY}$ (g/15 mm width) | $F_{EVOH}$ (g/15 mm width) |
| 9 | 20 | — | 60 | 15 | — | 5 | 11.2 | Peeling | 270 |
| 10 | 30 | — | 40 | 25 | — | 5 | 13.4 | " | 280 |
| 11 | 30 | — | 30 | 35 | — | 5 | 11.9 | " | 260 |
| 12 | 15 | 10 | 60 | 10 | — | 5 | 11.6 | " | 240 |
| 13 | 30 | 10 | 30 | 25 | — | 5 | 13.4 | " | 290 |
| 14 | 30 | 20 | 30 | 15 | — | 5 | 11.2 | " | Peeling |
| 15 | 30 | — | 30 | 25 | 10 | 5 | 17.0 | " | 750 |
| 16 | 30 | — | 30 | 25 | 10 | 5 | 13.8 | " | 960 |
| 17 | 10 | — | 80 | 5 | — | 5 | 5.4 | 160 | 110 |

What is claimed is:

1. An olefin polymer composition comprising (A) 100 parts by weight of a member of the group consisting of a homopolymer of 1-butene composed substantially of 1-butene units, and a copolymer of 1-butene and another alpha-olefin containing at least 60 mole % of units derived from 1-butene, (B) 10 to 600 parts by weight of a member of the group cosisting of a homopolymer of propylene a block copolymer of propylene and an alpha-olefin having 4–8 carbon atoms and at least 50 mole % of units derived from propylene, and a random copolymer of propylene and an alpha-olefin having 4–8 carbon atoms and containing at least 90 mole % of units derived from propylene, and (C) 10 to 600 parts by weight of a member of the group consisting of crystalline random copolymer of propylene and another alpha-olefin containing 50 to 87 mole % of units derived from propylene, at least one of components (A), (B) and (C) being partly modified with (D) an unsaturated carboxylic acid or its derivative.

2. The composition of claim 1 wherein component (B) is a member of the group comprising at least partly modified with the unsaturated carboxylic acid and its derivative.

3. The copmosition of claim 1 wherein component (A) has an intrinsic viscosity, measured at 135° C. in decalin, of 0.7 to 10 dl/g.

4. The composition of claim 1 wherein component (B) has a melt flow rate of 0.1 to 200 g/10 min.

5. The composition of claim 1 wherein component (C) has a heat of crystal fusion of 10 to 80 joules/g as determined by thermal analysis using a differential scanning calorimeter.

6. The composition of claim 1 wherein component (D) is a member of the group comprising an unsaturated carboxylic acid having 4 to 8 carbon atoms and its anhydride.

7. The composition of claim 1 wherein the content of component (D) is 0.001 to 5% by weight based on the total weight of components (A), (B) and (C).

8. An olefin polymer composition comprising (A) 100 parts by weight of a member of the group consisting of a homopolymer of 1-butene and a copolymer of 1-butene and another alpha-olefin containing at least 60 mole % of units derived from 1-butene, and (B) 7 to 120 parts by weight, of a member of the group consisting of a homopolymer of propylene, a block copolymer of propylene and an alpha-olefin having 4 to 8 carbon atoms and containing at least 50 mole % of units derived from propylene, and a random copolymer of propylene and an alpha-olefin having 4 to 8 carbon atoms and containing at least 90 mole % of units derived from propylene, said composition being substantially free from an inorganic compound and at least one of components (A) and (B) being at least partly modified with (D) an unsaturated carboxylic acid or its derivative.

9. The composition of claim 8 wherein component (B) is at least partly modified with the unsaturated carboxylic acid or its derivative.

10. The composition of claim 8 wherein component (A) has an intrinsic viscosity, measured at 135° C. in decalin, of 0.7 to 10 dl/g.

11. The composition of claim 8 wherein component (B) has a melt flow rate of 0.1 to 200 g/10 min.

12. The composition of claim 8 wherein component (D) is a member of the group comprising an unsaturated carboxylic acid having 4 to 8 carbon atoms and its anhydride.

13. The composition of claim 8 wherein the content of component (D) is 0.001 to 5% weight based on the total weight of components (A) and (B).

14. A laminated structure comprising a substrate and a layer of a 1-butene polymer laminated thereto through an adhesive layer of the olefin polymer composition of claim 1.

15. The structure of claim 14 wherein the substrate is a member of the group comprising a metal, a ceramic, and a polar organic polymer.

16. A laminated structure comprising a substrate and a layer of a 1-butene polymer laminated thereto through an adhesive layer of the olefin polymer composition of claim 8.

17. The structure of claim 16 wherein the substrate is a member of the group comprising a metal, a ceramic, and a polar organic polymer.

18. A laminated structure comprising a substrate and a layer of a 1-butene polymer laminated thereto through an adhesive layer of an olefin polymer composition comprising (A) 100 parts by weight of a member of the group comprising a homopolymer of 1-butene composed substantially of 1-butene units and a copolymer of 1-butene and another alpha-olefin containing at least 60 mole % of units derived from 1-butene, and (B) 7 to 120 parts by weight, preferably 11 to 67 parts by weight, of a homopolymer of propylene composed substantially of propylene units, a block copolymer of propylene and another alpha-olefin containing at least 50 mole % of units derived from propylene, or a random copolymer of propylene and another alpha-olefin containing at least 90 mole % of units derived from propylene, at least one of components (A) and (B) being at least partly modified with (D) an unsaturated carboxylic acid or its derivative.

19. The structure of claim 18 wherein the substrate is a member of the group comprising a metal, a ceramic and a polar organic polymer.

20. The composition of claim 8, wherein component (B) is 11 to 67 parts by weight.

* * * * *